Figure 1:
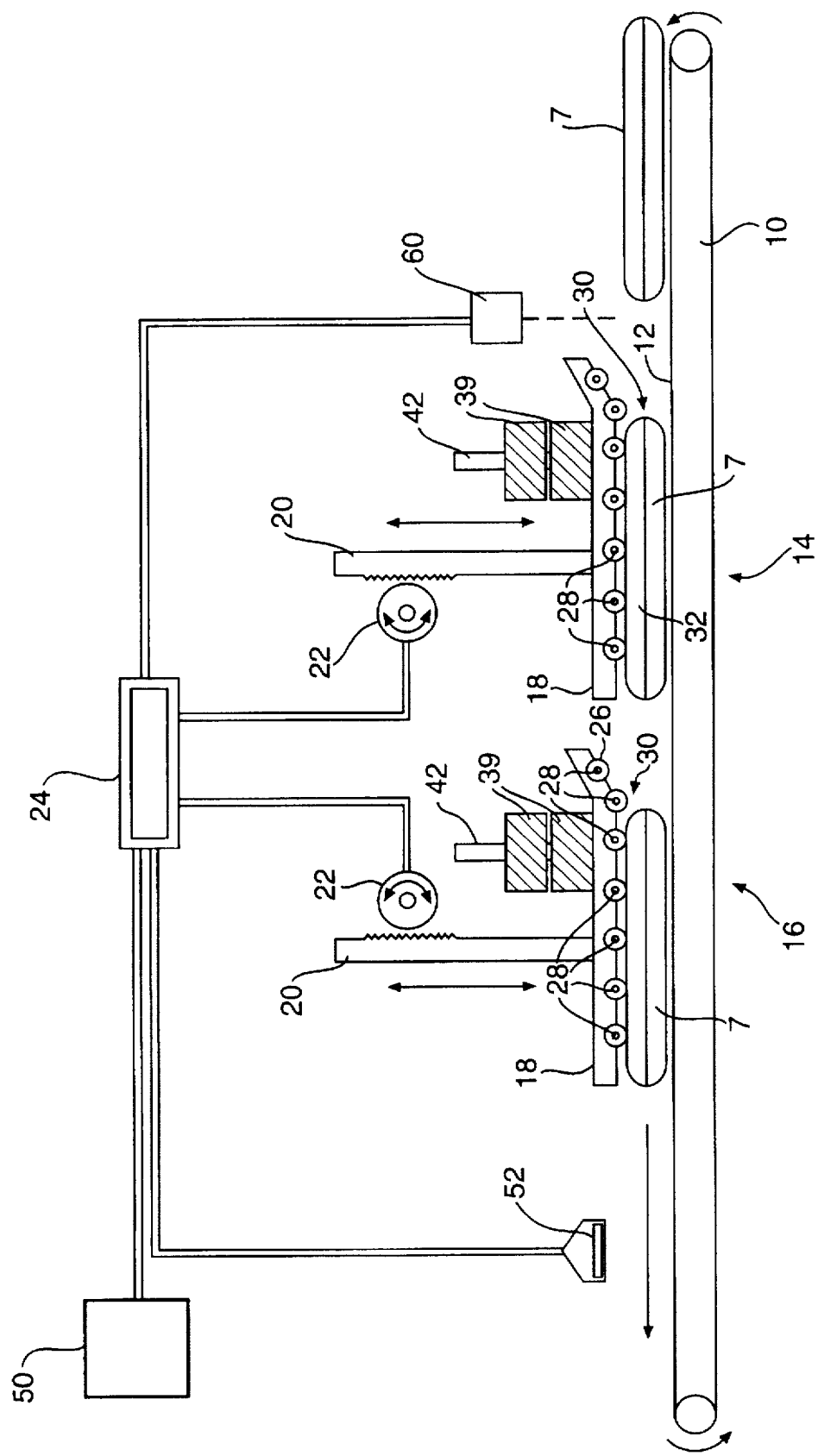

United States Patent [19]

Fenlon

[11] Patent Number: 5,786,530
[45] Date of Patent: Jul. 28, 1998

[54] TESTING OF PACKAGES

[75] Inventor: Christopher Fenlon, Bristol, Great Britain

[73] Assignee: Ishida Co., Ltd., Kyoto, Japan

[21] Appl. No.: 732,374
[22] PCT Filed: May 3, 1995
[86] PCT No.: PCT/GB95/01010
  § 371 Date: Nov. 1, 1996
  § 102(e) Date: Nov. 1, 1996
[87] PCT Pub. No.: WO95/30137
  PCT Pub. Date: Nov. 9, 1995

[30] Foreign Application Priority Data

May 3, 1994 [GB] United Kingdom ............ 9408705

[51] Int. Cl.$^6$ .................................................. G01M 3/34
[52] U.S. Cl. ........................................................ 73/49.3
[58] Field of Search ................................ 73/49.3, 45.4, 73/49.2

[56] References Cited

U.S. PATENT DOCUMENTS

| | | | |
|---|---|---|---|
| 4,148,213 | 4/1979 | Prakken | 73/45.4 |
| 4,649,740 | 3/1987 | Franklin | 73/49.3 |
| 4,671,101 | 6/1987 | Franklin | 73/49.3 |
| 5,284,003 | 2/1994 | Goodman et al. | 53/437 |
| 5,531,101 | 7/1996 | Fenlon | 73/49.3 |
| 5,533,385 | 7/1996 | Frievalt | 73/49.3 |
| 5,542,288 | 8/1996 | Fenlon | 73/49.3 |

FOREIGN PATENT DOCUMENTS

WO 93/17317  9/1993  WIPO .............. G01M 3/36

Primary Examiner—Hezron E. Williams
Assistant Examiner—Jay L. Politzer
Attorney, Agent, or Firm—Larson & Taylor

[57] ABSTRACT

Packages (7) are conveyed through at least one, and preferably two, test stations (14, 16). At each station there is a test head (7) which is urged towards the conveying path, preferably by gravity. As a package (7) is conveyed through a station it displaces the head away from the path. The displacement is monitored. Preferably, subsequent displacement towards the path due to leakage of the package is also monitored.

7 Claims, 1 Drawing Sheet

TESTING OF PACKAGES

The present invention relates to an apparatus and method for testing packages, e.g. packages of snack foods such as bags of crisps.

It is known to test a package by applying a load which tends to compress the package, and monitoring the effect. After an interval, the package may be tested again. For a good package, if the two tests use identical loads, then the package should behave identically, e.g. in terms of the amount of compression. But if the package contains air or other fluid and has a leak, the first test will cause some deflation. Thus the amount of compression will be greater than for a good package. Furthermore the package will already be in a deflated state at the start of the second test, and will undergo further deflation (unless it is already fully deflated). Testing equipment working on this principle has been brought to quite a high level of sophistication, e.g. as described in WO93/17317. But we have now found ways to improve the operation of such test systems.

In a first aspect, the invention provides test apparatus having conveyor means for conveying test substrates, and one or more test stations arranged along the conveying path; there being at least one such test station having a test head adapted to be moved towards and away from the conveying path; wherein the head is normally urged towards the conveying path so that a package being conveyed along the path contacts the head and urges it away from the conveying path; and wherein the resulting displacement of the head is monitored.

Desirably, the test head is urged solely by gravity towards the conveying path. Its contact surface is desirably such as to allow continuing movement of packages along the conveying surface. It preferably uses an array of low back line pressure rollers.

Since it is the arrival of a substrate that causes the movement of the test head directly, there is no need for sophisticated devices for synchronising the action of a test station with the arrival of a package, or for synchronising the actions of a plurality of test stations. Since the arrival of a substrate acts to raise a test head, if a second substrate arrives while a first substrate is still at the head, this merely causes further raising of the head, if necessary. In contrast, with prior art systems using powered pistons, the result tended to be the bursting of one or more packages. Furthermore, since a test head can be urged by gravity, the mechanism can be very simple. It is also very consistent and reliable, whereas pneumatic systems in particular are prone to variability. They also inevitably introduce vibration.

Preferably the apparatus has two test stations, each having a test head adapted to be raised by a substrate moving along the conveying path. Preferably each test station includes means for deriving a signal related to the displacement of the test head. The apparatus may also include computing means which receives data from the displacement detectors.

When a substrate reaches a test station, the test head is raised thereby. If the substrate is "leaky", the test head will then fall somewhat. Preferably the first test station is adapted to produce an additive output signal, or the data are treated additively by the computer. That is, if a substrate causes the head to rise by x and then to descend by y, the resulting datum corresponds to (x+y). Preferably the second test station leads to a differential datum corresponding to (x−y).

In conventional apparatus having two or more test stations, it is necessary to make careful mechanical adjustments to the relative heights of the test heads. In the present invention, particularly with gravity-urged heads, this is much less of a problem. Furthermore, adjustment can be made electronically, rather than mechanically. Thus if a "good" (non-leaky) substrate is passed through the system, it should give identical values at all test stations. If it does not, a correction can be applied by the computer to the data from one or more test stations.

Should it be desired to vary the load applied by a test head, this can be done simply by adding or removing weights to it.

In further aspect the invention provides a method of testing a substrate, comprising conveying the substrate through a test station having a test head arranged so that passage of the substrate urges displacement of the test head, which is urged against the substrate. The displacement of the head is monitored to gain information about the substrate. Preferably there are two test stations, to which the substrate passes successively. Preferably the method uses apparatus as referred to above.

An embodiment of the invention will now be described in more detail with reference to the accompanying drawing, in which the sole FIGURE is a schematic representation of apparatus embodying the invention.

The apparatus shows a conveyor belt 10 having an upper conveying run 12. The run 12 passes through two test stations 14, 16. These are essentially identical. Each has a test head 18 associated with a vertical stem 20 which displaceably engages an encoder 22 which provides an output indicative of relative displacement of the stem 20. The outputs from the encoders 22 are passed to a computer 24.

Each head 18 is primarily a carrier for a length of roller chain 26. This is a row of free-running rollers 28. Each roller 28 extends transversely of the conveyor run 12. It actually consists of a multiplicity of coaxial, independently rotatable rollers. Such roller chain is available from, for example, Rexnord. (Its conventional use is for conveyor belts, to provide a surface on which a conveyed article can be held stationary while the belt continues to run.) At the upstream end of each head 18, there is a lead-in formation 30, the chain 26 extending upwardly at an angle.

The heads are freely displaceable upwardly and downwardly. They are normally gravitationally urged to contact the conveying run 12. (Alternatively they can have stop means so that they do not descend quite that far.) The force can be varied by adding or removing weights 39 to a carrier 42. When a substrate 7, such as a packet of crisps, passes along the conveyor 10, it contacts the first lead-in 30 of the first head 18, causing it to rise. The amount of the rise is sensed by the encoder 22. As the substrate passes between the head and the conveyor, for the main, flat length 32 of the head, the head should not move. But if the packet leaks, the head will descend somewhat. Any such descent is also sensed by the encoder 22. The package leaves the first test station, and a similar sequence of events happens at the second test station 16.

The computer 24 receives the data from the two encoders 22. The data are analysed to provide information relation to the nature of the package, particularly its compressibility and leakiness.

As a substrate passes through a test station, it provides two pieces of data; a "rise" value for the amount that the head is raised by the arrival of a substrate; and a "fall" value (which may be zero) relating to the amount that the head falls while the substrate is beneath it. Preferably these pieces of data from the first station 14 are combined additively, whereas they are combined substractively at the second station 16. This can give extremely high sensitivity, as will be explained.

With a conventional apparatus, having two test stations each having a plunger which is forced down onto a substrate, a sound package arriving at the first station may allow the first head to move down by a distance such that the encoder counts a value of 150. The same will happen at the second test station. But consider a leaky package. At the first test station, some air or gas will be squeezed out, e.g. so that the head moves down by 200 counts. At the second station, if a similar amount of further leakage occurs, the head will move down by 250 counts. Thus the fact that the package is leaky will be shown by the fact that the ratio of the counts from the first station to the counts from the second station is 200:250 instead of 1:1. With the apparatus embodying the present invention, in a similar situation, a package arriving at the first station may raise the first head by 150 counts. If the package is sound, the same would happen at the second station. But if, once again, the package is leaky such that each head descends by 50 counts during passage of the package, then the first head is initially raised to a height of 150 counts and then falls by 50 counts, giving a total (additive) value of 200. The compressed package is such that it will only raise the second head through 100 counts. Assuming once again a leakage fall of 50 counts, the subtractive total is 50 counts. That is to say, the resulting values from the first and second heads are 200 counts and 50 counts. Thus instead of a given degree of leakiness being indicated by the ratio 200:250, it is indicated by the ratio 200:50. Clearly this is very much easier to detect. This means that much smaller leaks can be detected. This is further assisted by the consistency and lack of vibration resulting from the use of the gravity-urged system.

Data can also be passed to the computer 24 from a keyboard/display unit 50. For example this may be used to set acceptable limits for substrate thickness and leakiness. The apparatus may include means for removing rejected substrates from the conveyor 10., e.g. a blower 52 actuable by the computer. The computer may also receive an input from a substrate detector 60 immediately upstream of the first test station 14.

The keyboard can also be used to calibrate the system and allow for differences between the test stations. Thus it is set to calibration mode by means of the keyboard, and a standard, non-leaky substrate is run through the system. If the rise values of the two heads 18 are not identical, the computer stores a compensation value to be added to or substracted from the data given by one encoder.

I claim:

1. Test apparatus comprising conveyor means for conveying an object along a conveying path and through one or more test stations arranged along the conveying path, at least one of said test stations comprising a test head which is freely movable toward and away from the conveying path; said test head being urged solely by gravity towards the conveying path so that an object being conveyed along the path which contacts the head urges the head away from the conveying path; said test head having a contact surface comprising an array of free running rollers adapted to contact and to allow continuing movement of an object along the conveying path; said test station being actuated by the displacement of the test head by contact of the test head with an object moving along the conveying path, there being no additional means for synchronising the action of the test station with the arrival of an object at the test station; and means for monitoring displacement of the head, said displacement monitoring means comprising means for measuring the displacement of the head and means for providing an output signal related to the measured displacement of the head.

2. Apparatus according to claim 1 wherein the apparatus comprises two of said test stations.

3. Apparatus according to claim 2 wherein said displacement monitoring means comprises means for measuring the displacement of the test head of each of the two test stations, and means for providing an output signal related to the displacement of each of the test heads of each of the two test stations, and wherein the test apparatus includes computing means which receives said output signals.

4. Apparatus according to claim 2 wherein said displacement measuring means comprises means for determining at each test station a rise value R related to the distance through which a respective test head is moved away from the conveying path by an object, and a fall value F related to the distance through which the head returns towards the conveying path while in contact with an object; and means for determining (R+F) for a first of said two test stations and (R−F) for a second of said two test stations.

5. Apparatus according to claim 1 wherein said test head comprises means for holding a weight to establish a load applied by that test head.

6. A method of testing a sealed flexible package comprising conveying the package along a conveyor path through a test station of a test apparatus, said apparatus comprising conveyor means for conveying an object along a conveying path and through one or more test stations arranged along the conveyor path; at least one of said test stations comprising a test head which is freely movable toward and away from the conveying path; said test head being urged solely by gravity towards the conveying path so that a package being conveyed alone the path which contacts the head urges the head away from the conveying path; said test head having a contact surface comprising an array of free running rollers adapted to contact and to allow continuing movement of a package along the conveying path; said test station being actuated by the displacement of the test head by said contact of the test head with a package moving along said conveyor path, there being no additional means for synchronising the action of the test station with the arrival of a package at the test station; and means for monitoring displacement of the head, said displacement monitoring means comprising means for measuring the displacement of the head and means for providing an output signal related to the measured displacement of the head whereby passage of the package along conveyor path through said test station causes displacement of said test head, the method further comprising monitoring the displacement of the test head to gain information about the package.

7. A method according to claim 6 wherein said apparatus comprises two of said test stations and wherein the method comprises passing the packages through said two test stations.

* * * * *